United States Patent [19]

Heess et al.

[11] Patent Number: 4,824,187
[45] Date of Patent: Apr. 25, 1989

[54] PRESSURE BOOSTER AND MODULATOR

[75] Inventors: Gerhard Heess, Tamm; Anton Van Zanten, Ditzingen, both of Fed. Rep. of Germany

[73] Assignee: Robert Bosch GmbH, Stuttgart, Fed. Rep. of Germany

[21] Appl. No.: 887,301

[22] Filed: Jul. 23, 1986

[30] Foreign Application Priority Data

Jul. 23, 1985 [DE] Fed. Rep. of Germany ....... 3526190
Jun. 27, 1986 [DE] Fed. Rep. of Germany ....... 3621492

[51] Int. Cl.$^4$ .......................... B60T 8/32; B60T 13/74
[52] U.S. Cl. ........................................ 303/114; 60/545; 303/113; 303/118; 303/119; 303/115
[58] Field of Search .......................... 60/545, 581, 579; 303/113-119, 61-63, 68-69, 15-18, 2-4, 20, 91, 7, 13; 335/184, 219; 92/84, 109; 188/152, 158-165; 251/129.01-129.22

[56] References Cited

U.S. PATENT DOCUMENTS

| | | | |
|---|---|---|---|
| 3,690,736 | 9/1972 | Smirl et al. | 303/21 F |
| 3,731,979 | 5/1973 | Mikaila | 303/21 F |
| 4,083,609 | 4/1978 | Cochran | 303/113 X |
| 4,275,934 | 6/1981 | MacDonald | 303/119 |
| 4,709,969 | 12/1987 | Heess et al. | 303/119 X |
| 4,714,300 | 12/1987 | Heess et al. | 303/119 X |

FOREIGN PATENT DOCUMENTS

0025714 3/1981 European Pat. Off. .

Primary Examiner—Douglas C. Butler
Attorney, Agent, or Firm—Edwin E. Greigg

[57] ABSTRACT

A brake pressure booster and modulator for vehicle brake systems, in which a displaceable part is disposed in a pressure chamber that is acted upon by a master cylinder and communicates with the wheel brake cylinders, this part being in turn part of a permanent magnet, so that with increasing or decreasing pressure from the master brake cylinder, a transfer storage of potential energy takes place to a simultaneously increasing extent in one or the other direction by a magnetic operative connection with a second magnet. To effect pressure modulations when anti-skid functions are realized, the second permanent magnet is in operative magnetic communication with the first magnet and simultaneously is subjected to the movement of this second permanent magnet to open a relief pressure chamber while simultaneously closing the primary pressure chamber.

27 Claims, 4 Drawing Sheets

PRESSURE BOOSTER AND MODULATOR

BACKGROUND OF THE INVENTION

The invention is based on a pressure booster and modulator used as a brake pressure booster and modulator simultaneously, in the manner of an integrated anti-skid system, for performing ABS or anti-skid functions in vehicle brake systems. Hydraulic brake systems, for instance having multi-circuit tandem master brake cylinders, such as shown in German Offenlegungschrift No. 27 23 734 are known. It is known to provide such brake systems with anti-skid (ABS) functions, e.g., incorporating electrically actuatable multi-position magnetic valves, which realize the desired and necessary anti-skid control functions, in the outgoing brake pressure lines leading to the wheel brake cylinders. If there is a pressure drop, these magnetic valves close the particular pressure line from the master brake cylinder to the associated wheel brake cylinders and if needed deliver pressure fluid to the return system. If a renewed pressure rise is desired, then communication with the master brake cylinder is reestablished, along with arbitrary pressure/time courses, and with the option of keeping the pressure unchanged, without either a rise or a drop, as well. The prerequisite in such vehicle brake systems is always the availability of an energy source, which furnishes the brake fluid to the master brake cylinder at high pressure, so that after the braking effect to be attained has been specified, this brake fluid can be fed into the pressure lines leading to the wheel brake cylinders. A separate energy source of this kind, which typically is a pump that includes an electric motor driving it and appropriate pressure switches, is also required for anti-skid functions, because with the electrically actuatable multi-position magnetic valves of the prior art, brake medium or brake fluid that is under pressure is practically "lost" and must be pumped back up again later to the high pressure that is required for the braking process. In realizing anti-skid functions, it is also necessary to design such systems, which effect an interruption of the brake lines and an outflow of the pressure fluid in them, very reliably and in a very fail-safe manner, so that if a failure occurs there will be no danger that too much high-pressure brake fluid will be drained out or that it will no longer be at all possible to furnish brake fluid to the wheel brake cylinders.

In the field of realizing anti-skid functions, it is also known (U.S. Pats. Nos. 3,690,736 and 3,371,979) to attach a parallel branch in the lines leading from the master brake cylinder to the various wheel brake cylinders, and to connect this branch with a chamber which is variable, by means of an electrically actuatable cylinder-piston assembly, in accordance with the triggering of an actuating coil counter to the pressure of a spring, so that a volume of pressure can be removed from and then returned to the brake line again; this is known as the basic plunger principle. In this case, although the brake circuit again remains closed, means are still required for interrupting the further delivery of high-pressure brake pressure fluid from the master brake cylinder during anti-skid functions, so that the removal of pressure fluid can be come at all operative from the variable chamber to the wheel brake cylinders. This interruption can also be made possible as set forth in U.S. Pat. No. 3,690,736 in which the retreating piston simultaneously liberates a ball valve so as to close the master brake cylinder feed line. However, if the system fails at this point, then it is no longer possible to generate any braking pressure at all from the master brake cylinder, that is, by actuating the brake pedal.

OBJECT AND SUMMARY OF THE INVENTION

It is accordingly an object of the present invention to devise a brake pressure booster and modulator simultaneously, in particular for vehicle brake systems, which while dispensing with an external pressure supply, is on the one hand capable of furnishing a suitably further-increased or boosted pressure at the wheel brake cylinders, as a function of the brake pressure fed in, and at the same time is embodied such that a modulation of the brake pressure present at the wheel brake systems for the purpose of realizing anti-skid functions can be accomplished without undue expense, using basic and identical pressure booster components.

The pressure booster and modulator according to the invention, which is intended in particular for the brake pressure in vehicle brake systems, attains an advantage that, with an intrinsicially completely self-contained structure of the brake pressure booster and modulator, having only one inlet for supplying the brake pressure originating in the master brake cylinder and only one outlet for connection to the one or more wheel brake cylinders, has the following advantages:

no external energy source is required for brake pressure boosting; instead, the force required for a given braking event and boosting the brake pressure is obtained by the transfer storage of potential energy and is regained once again in the same manner at the end of the braking event, or in other words substantially without any energy loss except for slight losses due to hysteresis;

because an external energy supply is dispensed with, except for electrical control energy supplied to exciter coils, the brake pressure booster and modulator is not only less expensive than conventional brake boosters, but also is compact and can be mounted in comparatively little space and therefore can also be disposed close to the wheel brake cylinders.

Still further advantages of the invention are that while using essential basic components, the brake pressure booster is simultaneously capable, by supplying appropriate electrical trigger signals to an exciter stage, of realizing arbitrary ABS or anti-skid functions, in the form of a so-called integrated anti-skid system with continuous transition and direct action, based on this capacity;

by providing merely one additional exciter coil, a simple expansion is attainable for the functions of an anti-slip regulating means (ASR) as well; and furthermore, for pressure modulation in the area of realizing ABS functions, only a very slight energy requirement is necessary, so that there is no feedback effect of the pressure modulation to the brake pedal, although naturally it is possible to inform the driver via indicator lights and the like, and finally, the brake pressure booster can be suitably designed for generating desired pressures simply by connecting further brake pressure boosters, operating on a magnetic basis, in series.

The characteristics recited herein enable further development and improvement of the pressure booster and modulator.

A further advantage is the opportunity to design a magnetic brake pressure modulator without any perceptible feedback to the pedal at the onset of pressure modulations for realizing ABS functions, yet with a selectable pressure boosting factor; to displace the permanent magnet, which is movable at the onset of pressure modulations, an external linear positioner, which is preferably electromagnetic, engages the permanent magnet and is supplied with appropriate electrical signal combinations for excitation. Because of this movement at the onset of ABS functions, a shutoff via peripheral edges from inflow openings disposed in the modulator housing simultaneously interrupts brake pressure supply and when displaced upon further brings about a desired increase in volume in the area near the wheel brake cylinders.

In a further exemplary embodiment it is advantageous that if the so-called pressure-displacement characteristic curve of the wheel brake undergoes a change, even when as in this situation the brake booster is becoming unstable because of an automatic movement of the existing magnets relative to one another and because of a possible resultant sticking together of the magnets, then although the brake pressure boosting brought about by the magnets no longer occurs, still the brake can continue to be actuated. Then both magnets are displaced together upon initiation of braking, so as to increase the pressure in the region of the wheel brake cylinders.

Finally, in a third exemplary embodiment, it is advantageous that in order to avoid a possible instability from the outset, the characteristic curve of the magnetic forces can be adapted to the characteristic curve of the wheel brake.

The invention will be better understood and further objects and advantages thereof will become more apparent from the ensuing detailed description of preferred embodiments taken in conjunction with the drawings.

DESCRIPTION OF THE PREFERRED EMBODIMENT

The basic concept of the present invention is to effect transfer storage of existing potential energy, with the opportunity of regaining it, for boosting brake pressure, preferably using magnetic systems, and at the same time, for brake pressure modulation, to connect the pressure chamber that effects the pressure boosting to a further relief chamber via a valve, the volume of the relief chamber being determined by a further, movable magnetic element.

Figure 1:
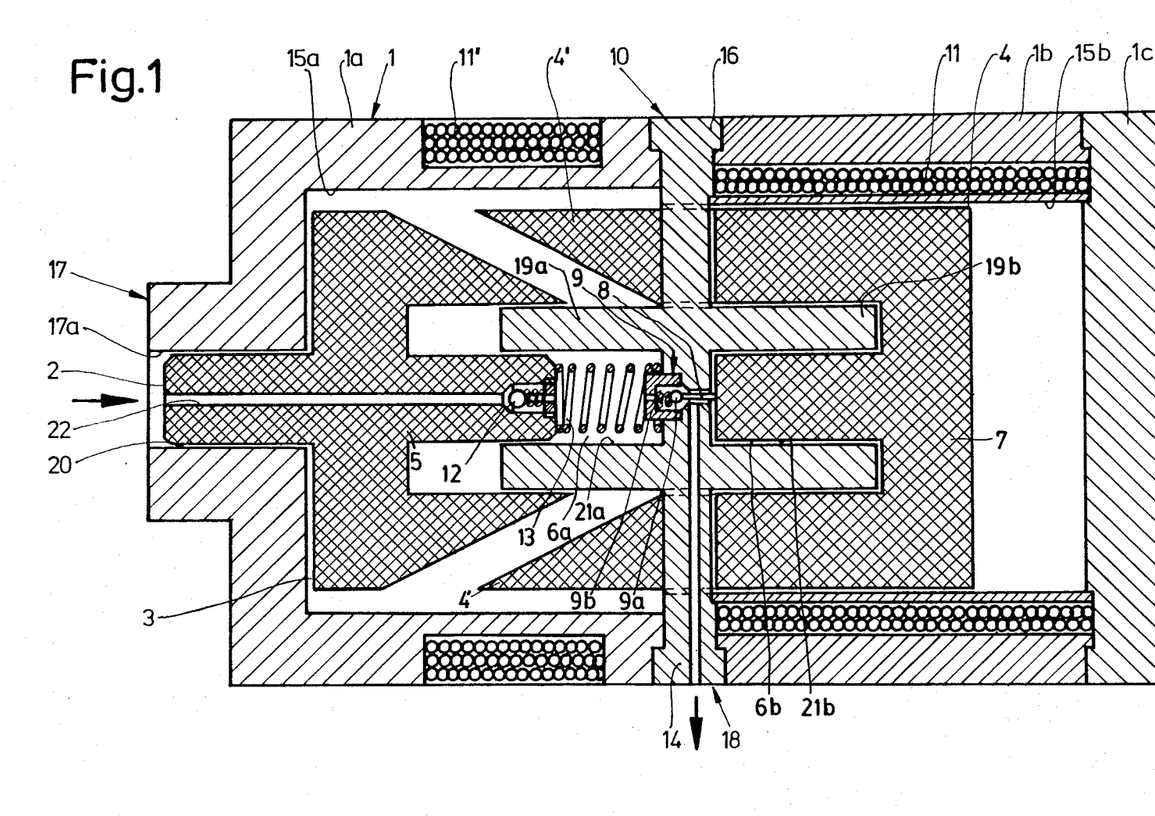
FIG. 1 is a cross section taken through a schematic illustration of the compact structure of a brake pressure booster simultaneously acting as a brake pressure modulator disposed inside a closed housing.

In FIG. 1, 10 indicates the brake pressure booster and modulator according to the invention, which is hereinafter called merely a pressure modulator, for the sake of simplicity. It has a housing 1, made up of two halves 1a and 1b, both of them being generally cupshaped with internal recesses or chambers 15a, 15b, which given the generally rotationally symmetrical shape of the housing are cylindrical and open at one end. The two hollow cylinder shapes 15a, 15b thereby formed are divided by an approximately central partition 16; the entire housing 1 thus is substantially in one piece, having a pressure inlet end at 17 and a pressure outlet in the central partition at 18. The pressure inlet 17 is embodied as a pipe stub having an inner bore 17a, which may communicate in a suitable manner with a pressure line from the master brake cylinder when the pressure modulator is used, as preferred, in vehicle brake systems, while the outlet 18 is intended to communicate with one or more lines leading to wheel brake cylinders, preferably over the shortest possible route, because with its compact and therefore small structure, the pressure modulator can preferably be disposed immediately adjacent to the wheel brake cylinder.

In the exemplary embodiment shown in FIG. 1, the actual chambers having to do with pressure boosting and pressure modulation are considerably reduced in circumference as compared with the housing recesses 15a, 15b; however, it will be understood that the invention is not limited to this special form of embodiment, which merely represents a special adaptation to particular requirements in practice. In the exemplary embodiment shown, suitable cylindrical annular walls 19a, 19b therefore form inner cylindrical pressure chambers 6a and 6b, preferably integrally and beginning at the partition 16 on opposite sides thereof and being open toward both sides, in which respective cylindrically formed inner pistons or plungers 5 and 7 are guided in a slidably displaceable and sealed manner. As will be explained in greater detail below, the first piston or plunger 5 may be part of a larger slidable element, namely a permanent magnet 3, which is axially movable in cylinder 15a, or may be secured to such an element, while the piston or plunger 7 is part of or in any case secured to a further permanent magnet 4 which is axially movable in cylinder 15b.

Opposite the plunger 5 and joined with it to execute a displacement in common or preferably being embodied integrally with the plunger 5, a further piston or plunger 2 is disposed in a narrowed cylindrical guide 20 of end 17 of one housing part 1a, so that its end face is subject to the pressure of the brake fluid arriving from the master brake cyliner; parts of the permanent magnets 3 and 4 extend, via the respective internal cylindrical guides 21a and 21b which are formed by the annular walls 19a, 19b, into the free space formed by the recesses 15a, 15b and thus have a substantially greater extension in terms of surface area and volume, with function courses which in permanent magnets are correspondingly improved and boosted; this will be described further below. The polarity of the permanent magnets 3 and 4 are such that appropriate forces of attraction arise between the two strong permanent magnets 3 and 4, both of which are slidably supported in the recesses 15a, 15b; these forces will also be described in further detail below, in conjunction with the discussion of the function of the invention. In its outer annular portion, that is, outside the central annular wall parts 19a, 19b that form the cylindrical guides 21a and 21b, the central partition 16 is provided with openings shown by dotted lines which also extend over a wide area, so that as indicated in the drawing, wedge-shaped parts of the permanent magnet 4 indicated at 4' also extend into the housing recess 15a on the left as seen in the drawing, so that it is possible to reduce the distance between the two permanent magnets accordingly and to move the permanent magnet 3 with its "south pole" close enough to the "north pole" of the permanent magnet 4 so as to attain the maximum possible forces of attraction and action. In other words, the permanent magnet 4 extends with extensions or feet through the holes or openings in the partition 16 toward the permanent magnet 3, both magnets having preferably complementary outer forms, as shown. That is, the permanent magnet 3 tapers or comes to a point in the direction toward the permanent magnet 4, while the permanent magnet 4, with its extensions, forms a conical opening for receiving the correspondingly protruding parts of the permanent magnet 3.

It will also be understood that the plungers 5 and 7 and also 2 may also be made of some different material from that of the permanent magnets 3 and 4; and finally, the entire permanent magnet 3 may also merely be one piece of magnetizable material, such as steel or soft iron. A pre-stressing spring 13 disposed in the pressure chamber 6a serves to keep the two permanent magnets 3 and 4 apart in the position of repose—that is, when the brake pedal is not being actuated—on the condition that in this case the permanent magnet 4 is located on its stop, on the left as seen in the drawing. This stop also keeps the permanent magnet 4 in its position of repose in any event, because of the mutual force of attraction.

The pressure chamber 6a simultaneously communicates via a valve 9 with the outlet connection 18 to the wheel brake cylinders and with the further relief chamber 6b, which receives brake fluid and which when the permanent magnet 4 is in position on its stop can simultaneously also act as a pressure chamber, depending on the course of any ABS functions to be performed. The valve 9, in detail, is structured such that a valve ball 9a is pressed by its own pre-stressing spring 9b against a seat that blocks off the outlet of the pressure chamber 6a to the outlet connection 18 and to the relief or pressure chamber 6b; however, a narrow pressure rod or pin 8 is disposed on the plunger 7, which when the permanent magnet 4 is in position on its stop raises the valve ball 9a from its seat and therefore connects the pressure chamber 6a with all the outlet connections.

Adjacent to the permanent magnet 4, there is also an exciter coil 11 surrounding it, which when appropriately furnished with electric current can move the permanent magnet 4 away from its stop, initially in a predetermined direction and in this case toward the right as seen in the drawing. As a result, with the simultaneous closure of the valve 9, the relief pressure chamber 6b enlarges. The detailed structure of the pressure modulator shown in the drawing therefore includes a first cup-shaped housing part 1a, with its open end closed by the partition 16 which can be screwed to it, and a second housing part 1b, partly in the form of an annular wall 1b fitted onto the partition 16 with appropriate annular fits and completed by means of a cap shown and set in place at 1c. The exciter coil 11 may be covered, opposite the recess and the chamber 1b, by a further annular wall, which is preferably of non-magnetic material.

The following basic function is thereby provided, with the following discussion initially pertaining to the pressure boosting process. It is assumed that the brake pressure from the brake pedal and master brake cylinder is present at the inlet connection 17. This pressure exerts a force acting toward the right, in the plane of the drawing, upon the plunger 2, which is either firmly connected to or part of the permanent magnet 3. In every position, the permanent magnet 3 is likewise attracted to the right as seen in the drawing by the strong permanent magnet 4, so that the force with which the plunger 5 is driven toward the right and exerts a corresponding pressure force upon the brake fluid located in the pressure chamber 6a is the sum of the fluid force on the end face of plunger 2 and the magnetic attraction of magnet 4 on magnet 3, which act toward the right. In this way, the brake pressure is boosted by the pressure present at the inlet to become the pressure present in the chamber 6a; with the valve ball 9a raised from its seat, this pressure then acts upon the associated wheel brake cylinder as a result of the communication of the pressure chamber 6a with that wheel brake cylinder via outlet 18. In order to raise the valve ball 9a from its seat by means of the pin 8, the plunger 7, as part of the permanent magnet 4 or being secured to it, must be located on the left-hand stop as seen in the drawing, and this left stop is in any event secured by the mutual force of attraction, that is, magnetic force, which the permanent magnet 4 exerts upon the permanent magnet 3 or on the magnetic part located there. It will be understood in this context that since the three-way function in the valve area means that the plunger 7, or the relief pressure chamber 6b it closes, is also subjected to the wheel brake pressure, this force must be smaller than the force which the permanent magnets 3 and 4 mutually exert upon one another, so that the plunger 7 will remain on the lefthand stop and the ball 9a will remain raised from its seat by the pin 8. Accordingly, a suitable selection of the cross-sectional area of the plunger 7 must be made.

This basic function of the brake pressure boosting by means of transferring storage of potential energy is a substantial characteristic of the present invention: The corresponding pressure increase results from the increasingly close approach of the two magnets 3 and 4 to one another, so that the energy liberated in this way is absorbed or stored by the increasing brake fluid pressure that is present at the wheel brake cylinder. If the brake pressure fed in at the inlet 17 is removed, then the components are returned to the position shown in the drawing by a force of the fluid pressure on the end of permanent magnet 3 and the spring force between the magnet 3 and 4, with the result that the low pressure at the wheel brake cylinder is regained by regaining the distance between the permanent magnet 3 and the permanent magnet 4, in which magnet 4 remains on its stop; this regaining of distance represents a transfer of potential energy storage from the fluid back to the permanent magnet 3. During movement of magnets 3 and 4 in cylinders 15a and 15b, the fluid can flow from front to back via the spacing to equalize the fluid pressure in the cylinders.

The function of pressure modulation, for instance assuming that the pressure in the wheel brake cylinder is to be reduced while the pressure continues to be present at the inlet 17, is then performed by supplying an appropriate current to the exciter coil 11, which displaces the permanent magnet 4, and with it the plunger 7, toward the right as seen in the drawing, to an extent that corresponds to the dimension of the electrical triggering. As a result, first the pin 8 loses contact with the valve ball 9a, so that the pressure chamber 6a is closed to the outlet line 18; following this interruption of pressure communication between the pressure chamber 6a and the wheel brake cylinder via outlet 18, further movement of the permanent magnet 4 to the right in response to the current supplied, effects a pressure reduction in the associated wheel brake cylinder, because of the increase in volume in the relief pressure chamber 6b that is being opened by return of fluid from the brake cylinder. Any further increase of the current in the exciter coil 11 leads to a movement of magnet 4 and a further pressure drop in the wheel brake cylinder, and vice versa; if the current in the coil is reduced again, in accordance with a desired ABS function course, then the pressure in the wheel brake cylinder is again increased accordingly, preferably in a continuous rather than incremental process because of the attraction of magnet 3 on magnet 4.

In this context, it will be understood that the cross-sectional areas of the plungers 2, 5 and 7 as well as the force of attraction of the permanent magnets will all be matched to one another in such a way that the plunger 7, which by its movement forms the relief pressure chamber 6b, cannot be displaced to the right by brake pressure alone. Preferably, the cross section or diameter of the plunger 5 is selected to be somewhat smaller than that of the plunger 2, so that upon brake pedal actuation the pressure in the pressure chamber 6a is always greater than the brake pressure fed in from the master brake cylinder to the inlet connection, so that upon brake pedal actuation the valve ball 9a is pressed onto its seat.

The bore 22 extending centrally, in this case, through the plunger 2, the permanent magnet 3 and the plunger 5 enables reaspiration of brake fluid, when the brake is not being actuated, via the check valve 12 into the wheel brake cylinder or cylinders connected to the outlet. In terms of the shape of the permanent magnets 3 and 4, reference has already been made above to the desirability of attaining favorable magnet force relationships. It will be understood that the permanent magnets 3 and 4 are selected such that the force/travel characteristic curve between the permanent magnets is as favorable as possible; a favorable force/travel characteristic curve takes a course such that with steady (linear) pressure elevation at the inlet, the pressure in the wheel brake cylinder connected to the pressure modulator likewise increases steadily linearly.

From the basic structure shown in the drawing for the pressure booster and modulator according to the invention, it is also apparent that if a further exciter coil 11' is also provided, here in the vicinity of and therefore acting upon the position of the permanent magnet 3, a wheel brake pressure modulation can be performed even without actuating the brake pedal, because by means of an appropriate exciter current in the coil 11', the permanent magnet 3 and thereby the plunger 5 are shifted to the right in the plane of the drawing, resulting in a pressure increase in the chamber 6a and thus in the brake fluid present at the wheel brake cylinder. A correspondingly selective triggering thus provides a simple means of enabling the performance of anti-slip regulating functions (ASR).

The core of the invention is based on the principle of transfer storage of potential energy; if the permanent magnet moves to the right in the plane of the drawing, either in response to the pressure at the plunger 2 that derives from the master brake cylinder, or because of an excitation of the coil 11', then the magnetic force performs work, which is absorbed by the brake fluid as compression energy. The more the plunger 5 moves toward the right, the higher the pressure rises in the associated wheel brake cylinder and in the pressure chamber 6a—and admittedly the higher the feedback force exerted upon the plunger toward the left in the plane of the drawing by the brake fluid—but that feedback force is ovecome by the likewise correspondingly higher magnetic force, which acts upon the permanent magnet 3 toward the right.

Conversely, if one looks initially at the work purely of boosting, then at the end of a braking event work is performed by the brake fluid that was compressed beforehand, and this work causes a retreat of the permanent magnet 3 toward the left in the plane of the drawing (i.e., increasing distance is gained from the position of the permanent magnet 4, and there is a corresponding regaining of the potential energy by restorage of energy in magnet 3, and the brake fluid furthermore performs work in like manner whenever the permanent magnet 4 executes a displacement toward the right in the plane of the drawing in order to realize an ABS function; this work is absorbed by the permanent magnets 3 and 4 by means of the relative increase in their mutual spacing. The farther the permanent magnet 4 moves toward the right, the less is the brake pressure present at the wheel brake cylinder (and thus the less is the force of the brake fluid acting upon the plunger 7 as well), and the smaller does the magnetic force become as well. Only the difference between the magnetic force, on the one hand, and the force exerted by the brake fluid upon the plunger, on the other, has to be brought to bear for the purpose of pressure modulation by means of the current flowing through the coil windings 11.

It will also be appreciated that in a pressure modulation via the relief pressure chamber 6b, no feedback effect upon the brake pedal is perceptible, since the retreating plunger 7 closes the check valve 9 via the pin 8, and therefore pressure variations do not occur in the primary pressure chamber 6a.

The transfer storage of potential energy that takes place in the present invention, on the one hand in the form of the spacing relationship between the magnets and on the other hand in the form of compression pressure in the region of the wheel brake cylinder, is in contrast to the mode of operation of conventional brake boosters, in which potential energy stored in the brake fluid located in the wheel brake cylinder and in the supply lines cannot be regained during the expansion, and so such brake boosters require the external energy source, which functions as auxiliary energy. In the present magnetic pressure booster and modulator according to the invention, no external energy source is required, and with the transfer storage of potential energy the only losses that need to be replaced are those due to hysteresis.

Figure 2:
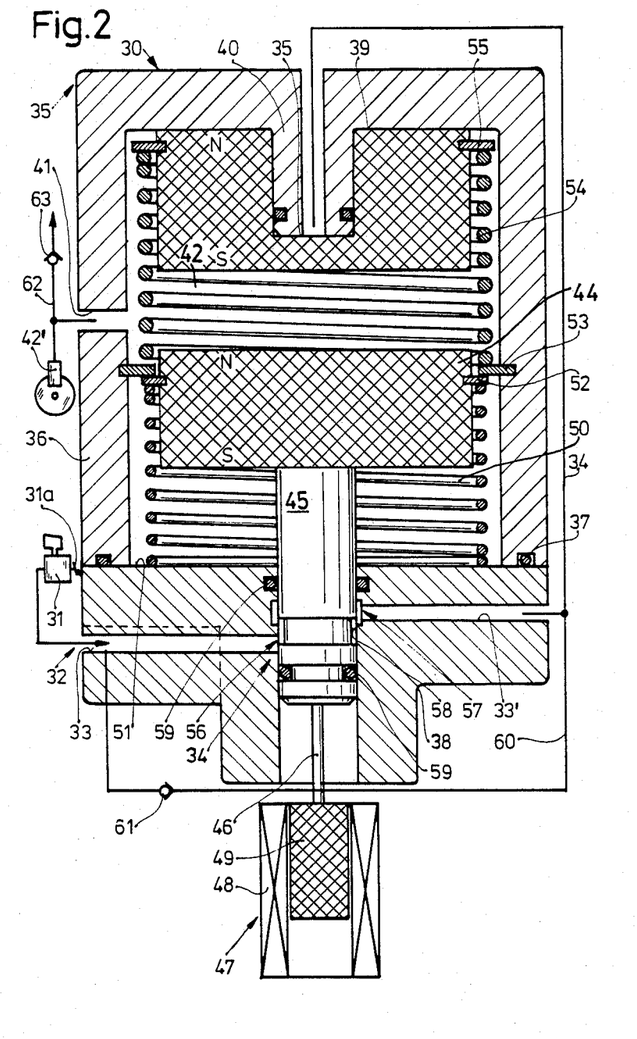
FIG. 2 shows a second, considerably different exemplary embodiment having a linear positioner engaging one of the magnets from outside, also shown schematically in cross section.

In the further exemplary embodiment, shown in FIG. 2, of a magnetic brake pressure modulator 30 lacking pedal feedback, the connection with the master brake cylinder 31 is at 32; the pressure line 33 inside the housing discharges initially into a valve area 34 and then continues at 33' and leads on via 34' pressure line into a working pressure chamber 35. It will be understood that the pressure line 34' although it is shown as an external connecting line in FIG. 2, may also be embodied as a conduit inside the housing.

The basic structure of the magnetic brake pressure modulator of FIG. 2 includes an outer housing embodied by a first cup-shaped upper part 36 and a lower lid or covering 38, mounted via an interposed seal 37 such as an O-ring and also containing the valve area 34. It will be understood that the embodiment of the housing is arbitrary per se; inside the housing, again displaceably supported and with a basically simplified structure as compared with FIG. 1, there are an upper magnet 39, which in its basic function corresponds to the magnet 3 of FIG. 1; in other words, by means of the relative displacement of this magnet 39 with respect to a stationary die, plunger or tang 40 formed by an inwardly pointing housing protruberance, the brake pressure supplied to the wheel brake cylinders is generated by the magnet 39 in a pressure work chamber 42. This pressure reaches the corresponding wheel brake cylinders 42' via an outlet connection 41, as shown schematically, and in this case the permanent magnet 39 is then displaced downward in the plane of FIG. 2 with a sliding guide surrounding and sealed off from the housing tang 40 by any suitable seal; as a result, the coincidence between the permanent magnet 39 and the housing tang 40 lessens, therefore necessarily causing a volumetric reduction in the pressure work chamber 42, which leads to the increase in brake pressure.

A second magnet 44 is disposed opposite the upper magnet 39; mechanically, via a rod 45 either affixed to or integral with it, this second magnet 44 also penetrates the valve area 34 and is connected to the outside via a connecting arm 46 with a linear, preferably electromagnetic positioner 47, which depending on the imposition of electrical energy on the positioner winding 48 retracts the positioner piston 49 to a variably great degree inside itself, that is, moves it downward in the plane of FIG. 2; this causes a corresponding displacement of the permanent magnet 44 and of the rod 45 affixed to it. As shown in FIG. 2, the permanent magnet 44 is retained by an upper stop 52 by an associated pre-stressing spring 50, which is supported on the inner housing bottom 51, embodied by the lower housing part 38, and at the top on the permanent magnet 44, for instance by an annular protrusion 52 that is either an inserted part or formed of the same material as the magnet 44. At the same time, this annular protrusion 52 serves on the other hand to provide a stop in combination with an inwardly protruding annular protrusion 53 affixed to the housing, which in turn simultaneously provides the support for the pre-stressing spring 54 of the upper permanent magnet 39, so that in the position shown in the drawing the magnet 39 is pressed upward, whereupon its pre-stressing spring 54 is supported on a further annular protrusion 55 on the permanent magnet 39. All the annular protrusions 52, 53 and 55 may for example be spring rings or the like engaging circumferential annular grooves on the permanent magnets and on the housing.

The rod 45 affixed to the permanent magnet 44 penetrates the valve area 34 and is thereby also intersected by the transverse conduits 33, 33', which with their discharge areas at 56 and 57 are disposed relative to an annular recess 58 in the rod 45. The rod 45 is guided in a sealed manner above and below the annular recess 58 via seals 59, such that the rod, with its annular recess 58, can either effect or interrupt the communication between the conduits 33 and 33', since the annular edges bordering on the annular recess 58, together with the discharge areas, form control edges in a manner known per se for closing or opening the valve area 34.

The result is then the following function of the above-described structure of a magnetic brake pressure modulator. Via the master brake cylinder connection 32, looking first at the brake booster function purely per se (without ABS pressure modulation), the brake pressure travels via the transverse conduit 33 to the valve area 34, while the lower magnet 44, as shown, is resting on the upper stop and its rod 45 that controls the valve area 34 is located in the position shown. Therefore the brake fluid can flow, unhindered by the rod, via the transverse conduit 33' and the connecting line 34' to the upper magnet 39. The brake fluid pressure generated by the master brake cylinder 31 presses the upper magnet 39 downward accordingly, positively displacing fluid out of the internal chamber 42 of the brake pressure modulator and via the outlet connection 41 to the wheel brake cylinder or cylinders 42', which thereby applies a braking force. At the same time, because of the magnetic attraction and because of the approach of the magnets toward one another as a result of the movement of the upper magnet 39, there is a resultant increase in the wheel brake cylinder pressure, which is thus higher than the master brake cylinder pressure, and this lasts until such time as the force of the upper restoring spring becomes greater than the magnetic force. The pressure boosting factor can be determined by the selection of the spring constant of the upper spring 54.

If an ABS pressure modulation becomes necessary, then the electromagnetic linear positioner 47 is triggered accordingly, in any event with a force that is greater than the force of the pre-stressing spring 40 which acts upon the lower magnet 44, thus resulting in a downward movement of the magnet 44 and rod 45. It will be understood that this actuation at the onset of ABS pressure modulations can be realized by means of an arbitrary linear positioner engaging the rod extension 46, even one different from the electromagnetic positioner shown, although this is preferably effected by systems that upon triggering with an electrical signal converts this signal into a travel variation for the rod 45. As a result, as will be readily apparent, the rod 45 with its shutoff edges of annular groove 58 then interrupts first the fluid flow communication between the master brake cylinder 31 and the continuing connecting line 34', and at the same time as triggering continues, enlarges the work chamber 42 of the modulator housing, because the rod 45, moves magnet 44 to increase the volume of the work chamber 42. In this manner, a correspondingly dimensioned pressure reduction in the wheel brake cylinder or cylinders 42' connected to the work chamber 42 is effected, as will be readily appreciated without any feedback effect on the brake pedal 31a of the master brake cylinder.

The returning bypass line 60 with the one-way check valve 61 also disposed in it, between the master brake cylinder connection at 32 and the connecting line 34' serves to reduce brake pressure during ABS operation whenever braking is interrupted. For reaspirating brake fluid in the event of fluid loss, the wheel brake cylinder or cylinders 42' are also connected to the brake fluid supply tank, which is not separately shown, via a connecting line 62 and a one-way check valve 63 disposed in it.

A particular advantage of this embodiment is also that the pressure modulator is "fail safe" in this respect, because if the linear positioner 47 should fail during ABS operation, the lower magnet 44 necessarily moves upward up to its stop 53 under the influence of the magnetic force that continues to act upon it and under the restoring force of its pre-stressing spring 50, whereupon the rod 45 reestablishes the communication between the master brake cylinder and the connecting line 34'. Therefore, although brake boosting and ABS pressure modulation are integrated in the system shown in FIG. 2, the failure of the linear positioner 47 has no effect no brake boosting. By the retraction of the lower magnet back onto its stop in the event of such a failure in brake pressure modulation, no brake fluid is drawn from the brake circuit either, so that the brake circuits remain completely closed.

Figure 3:
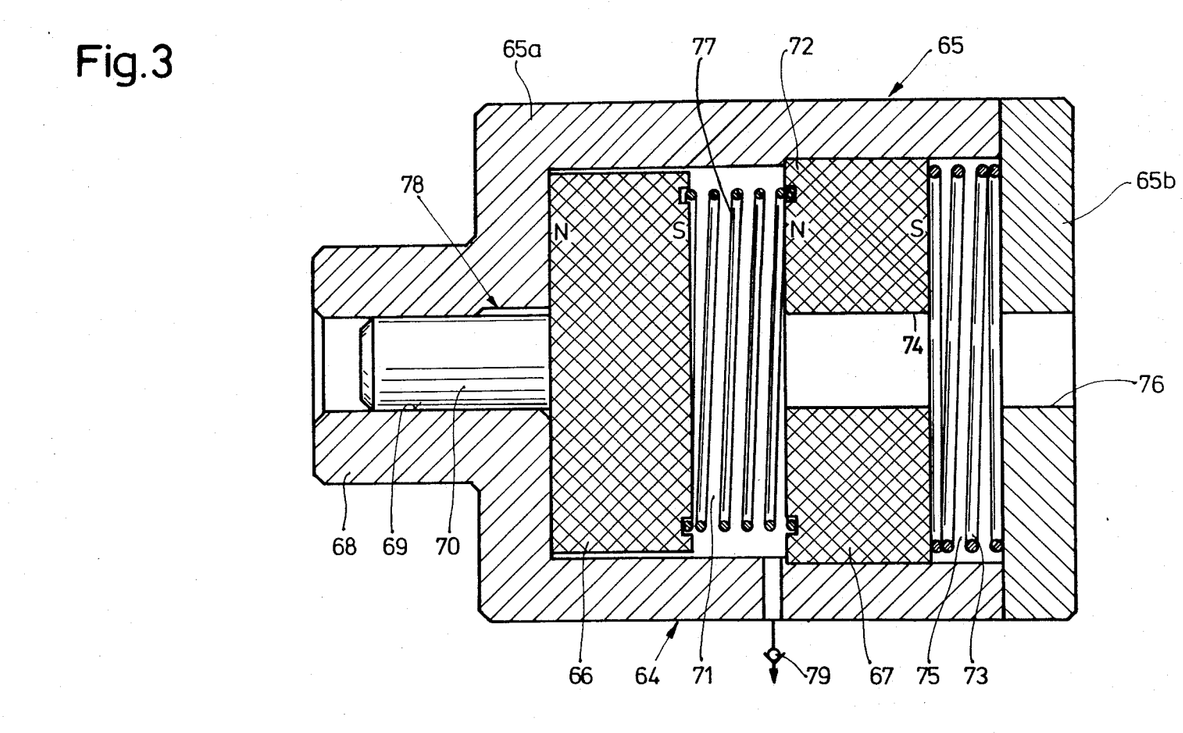
FIG. 3 shows a simplified embodiment of a magnetic pressure booster for vehicle brake systems, in which provisions are made so as to enable further actuation of the brake, although without pressure boosting, in the event of instability occuring in response to a change in the pressure/displacement characteristic curve of the wheel brake.

The exemplary embodiment shown in FIG. 3, which has been simplified in essential respects as compared with the exemplary embodiment of FIG. 1 (for instance by the elimination of the partition 16) is directed substantially to the possible cooperation of the two magnets 66 and 67, which here again are disposed movably inside the housing 65 of the pressure modulator 64. In this embodiment, the housing is embodied by a cup-shaped first housing part 65a, fitting over and substantially embodying the inner work chamber that also receives the magnets 66 and 67, and a lid or cover 65b closing it (naturally, once again other embodiments are possible). Once again, as in the embodiment of FIG. 1, the first housing part 65a has a pipe-union-like extension 68 on the left side as seen in the drawing, for connection with the line arriving from the master brake cylinder, and a plunger 70 is supported in the bore 69 of this extension in a slidably displaceable and sealed manner; the plunger 70 is in the form of an extended piston rod beginning at the magnet 66. The magnet 66 is not sealed off from the inner wall of the housing bore, but for instance is spaced apart freely from it, so that the reduction of the work chamber volume here again results from the insertion to an increasing extent of the plunger 70 into the chamber 71. The magnet 67 is pressed by its own pre-stressing spring 73 upon a stop shown at 72 formed by a shoulder in the housing and is guided in such a manner that it is sealed off with respect to the surrounding wall of the inner bore of the housing part 65a or in other words is guided in a slidably displaceable manner, but it has a through opening 74, for example centrally located, which connects the work pressure chamber 71 with the rearward pressure chamber or spring chamber 75, which has an outlet opening 76, which in turn communicates with one or more wheel brake cylinders, not shown in the drawing.

Between the two magnets, there is a further pre-stressing spring 77 which keeps the magnets spaced apart, and finally there is also an inner recess or throat, which serves as a relief groove 78, provided in the vicinity of the leak-free guidance for the plunger 70 in the pipe union or extension 68.

The following function then results, with the basic function being the same as in the foregoing exemplary embodiments: By appropriate pressure control originating in the master brake cylinder, the magnet 66 is moved to the right in the plane of FIG. 3, so that since the plunger 70, with its cross-sectional volume, enters the work or pressure chamber 71 to an increasing extent this chamber is reduced in its volume, and accordingly brake fluid is supplied to the wheel brake cylinders with its pressure boosted, which is a consequence of the existing force of attraction between the two magnets 66 and 67, which increases with decreasing distance between them.

Because of the freedom of movement of the right-hand magnet 67 away from its stop 72 and counter to the force of its pre-stressing spring 73, a degree of freedom is obtained which keeps the basic braking function operative even if the brake booster shown in FIG. 3 should become unstable in its boosting action. One reason for this could be that the pressure/displacement characteristic curve of the wheel brake varies such that a substantially lesser pressure increase than normal results when a corresponding displacement is such that the left-hand magnet 66 automatically moves so far to the right that the two magnets stick to one another. This eliminates the boosting of the brake booster that is brought about by the transfer storage of potential energy resulting from the magnetic action; nevertheless, with this kind of brake booster the brake can still continue to be actuated, because now both magnets are displaced together farther to the right, counter to the force of the right-hand spring. It is now no longer the (sealed) action of the plunger 70, which is displaced in its sliding guide, but rather the brake pressure that acts upon a substantially larger area, embodied by the right-hand magnet 67, and the rearward spring chamber 75 becomes the work chamber for transmitting the brake pressure. By the adhesion of the two magnets 66 and 67 to one another, the plunger 70 has retracted so far out of its bore toward the work chamber 71 that the relief groove 78 is opened up, and so when the two magnets 66 and 67 adhere to one another at the end of a braking maneuver, the pressure in the wheel brake cylinder can be reduced once again.

The middle pressure work chamber 71 communicates with the brake fluid supply container, not shown, via a one-way check valve 79.

Figure 4:
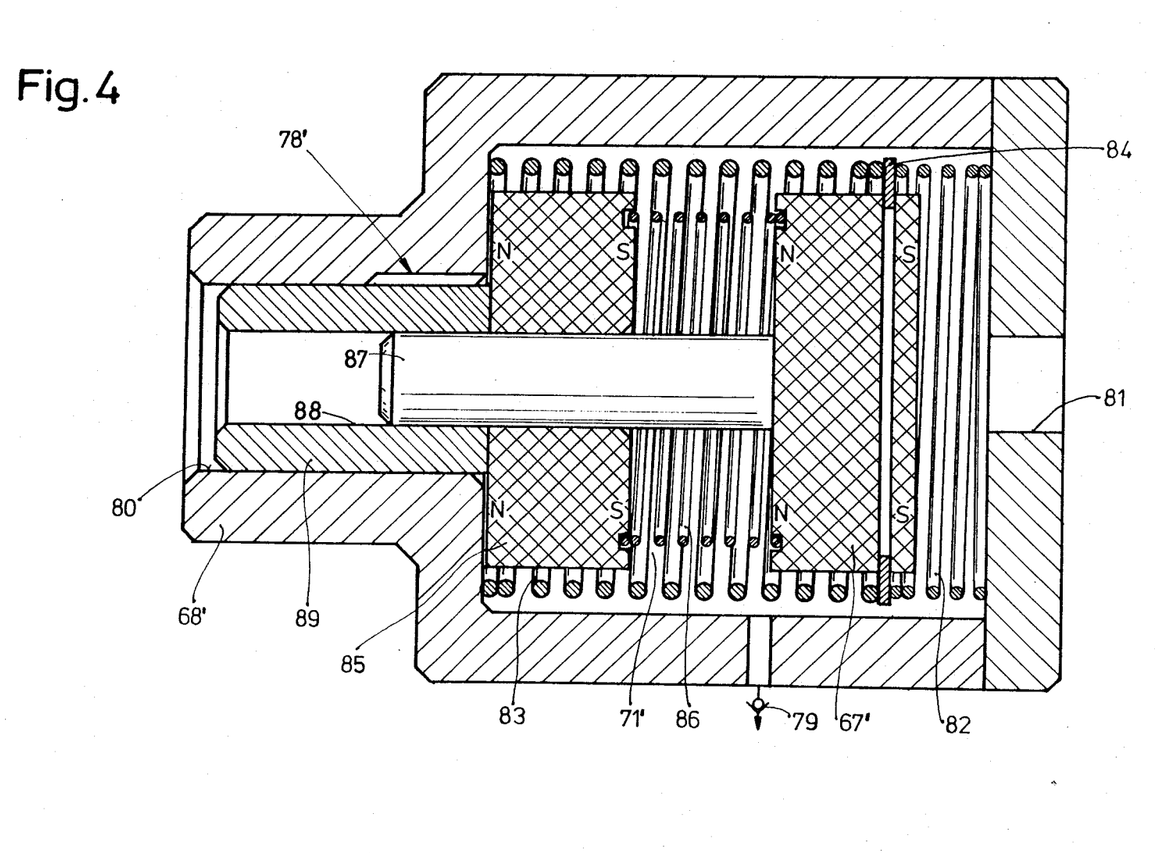
FIG. 4 shows an embodiment similar to that of FIG. 3, having means for adapting the characteristic curve to the possibly varying characteristic curve of the wheel brake, so as to avoid instability from the outset.

Finally, in the exemplary embodiment of a brake booster shown in FIG. 4, it becomes possible to effect an overall diminishing of the problem of instability. The connections of this brake booster with the outside are embodied as in the exemplary embodiment of FIG. 3, that is, the inlet connection 80, shown on the left in the drawing, communicates with the master brake cylinder and the outlet connection 81 communicates with the wheel brake cylinder or cylinders.

Here the pressure chamber 71' inside the housing fills the housing bore completely, and the magnet 67' on the right in the drawing is suspended freely or in other words floatingly, and is held in this position by pre-stressing springs 82 and 83. The pre-stressing springs engages the respective bottoms of the bore inside the housing and engage both sides of an annular protrusion 84 of the magnet 67'. The right-hand magnet 67' is therefore supported such that it is displaceable to both the right and the left, and it is additionally supported via a further pre-stressing spring 86 positioned between the magnets 85 and 67.

The right-hand magnet 67' is guided radially and axially by means of a rod 87 extending from it, which penetrates a central bore 88 of the left-hand magnet 85, and as a plunger, slides in a slidably displaceable manner and hence in a leak-free manner as well in an annular piston 89 secured to the magnet 85, which in turn actually completes the system shown in FIG. 3 with a relief groove 78' which begins at the left-hand magnet 85. Thus, it is the annular piston 89 which is slidably displaceably guided in a first inner bore of the narrowed pipe union 68' of the modulator housing and in which then in turn the plunger 87, beginning at the right-hand magnet 67', is slidably displaceably supported. It becomes immediately apparent that a further degree of freedom exists in the movement of the two magnets 67' and 85 relative to one another, this degree of freedom being that the two magnets 85 and 67' can assume a freely selected relative position with respect to one another and in terms of the various pressure forces being exerted, so that for example even if the pressure increase in the area of the wheel brake cylinder that would lead to a possible instability is less than usual (a variation in the pressure/displacement characteristic curve of the wheel brake), the distance between the magnets can be maintained; that is, within certain limits, these magnets do not have to move toward one another to the point of adhering to one another, precisely because the right-hand magnet 67' is capable of deflection, namely to the right, and is driven there by the pressure of the master brake cylinder, which is exerted upon the cross-sectional area of its own plunger 87. In other words, with the structure shown in FIG. 4 it is possible to adapt the characteristic curve of the magnetic forces to the characteristic curve of the wheel brake. Or looking at the situation from the other direction, if the pressure in the wheel brake cylinder increases sharply, then the right-hand magnet 67' is necessarily displaced more to the left, counter to the spring force of the springs 83 and 86 pre-stressing it, than if this pressure were rising only slightly. The reason for this movement of its own is that the wheel brake cylinder pressure can act upon the cross-sectional area of the plunger 87. The more the right-hand magnet moves to the left, the greater becomes the magnetic force acting upon the left-hand magnet 85. It will be appreciated that the boosting factor is therefore capable of adapting to the characteristic curve of the wheel brake within certain limits, and the danger of instability arises only if the characteristic curve of the wheel brake has an extremely flat course, or in other words when this brake is filled with air, so that the pressure from the master brake cylinder is not able to build up a corresponding counterpressure in the wheel brake cylinder. It will be understood that the prestressing springs 82 and 83 that keep the right-hand magnet 67' spaced apart from the left-hand magnet 85 and are supported on the modulator housing are embodied as strong enough that in normal braking the right-hand magnet 67' is displaced equally far toward the left as the left-hand magnet 85 is displaced toward the right relative to the housing.

The relief groove 78 of FIG. 3 and the relief groove 78' of FIG. 4 function to relieve the brake fluid pressure when the plunger 70 and annular piston 88 have moved sufficiently to the right to function as a modulator similar to the movement of the magnets of FIGS. 1 and 2 due to the magnetic coils. Thus the modifications of FIGS. 3 and 4 do function as pressure boosters and modulators.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A pressure booster and modulator in a vehicle brake system having an integrated anti-skid system for realizing anti-skid of ABS functions including pressure modulations, comprising a housing, an inlet (17, 33, 68, 80) and a main outlet (18, 41, 76, 81) in said housing, a potential energy storage means in said housing, a pressure chamber relative to said potential energy storage means, said pressure chamber (6a, 42, 71, 71') acted upon at least by brake pressure applied at said inlet from a master cylinder, and pressure chamber communicating via said outlet (18, 41, 76, 81) at least with an associated wheel brake cylinder and said pressure chamber (6a, 42, 71, 71') being so embodied that with increasing and decreasing brake pressure from said master cylinder, storage of potential energy is simultaneously transferred to an extent increasing in one direction of movement of said potential energy storage means, in order to effect wheel brake cylinder pressure chamber of pressure without an external pressure supply, said potential energy storage means includes at least a first movable permanent magnet forming a relationship of mutual attraction with a second movable permanent magnet, a relief means associated with said first and second permanent magnets which function with displacement of said first and second permanent magnets for realizing ABS functions.

2. A pressure booster and modulator in a vehicle brake system as claimed in claim 1, in which a valve assembly (34) disposed on said first permanent magnet (44) and actuatable such that upon the onset of ABS functions a volumetric increase takes place in said housing in an area near the wheel brake cylinder.

3. A pressure booster and modulator as defined by claim 2, which includes an electromagnetic linear positioner (47), a rod (45) guided in a leak-free manner in a sliding guide in said housing and fixed to said first permanent magnet (44) which for the realization of ABS functions is embodied as a displaceable part, said sliding guide including said relief means formed as a circumferential groove including peripheral edges which interrupts a supply of pressure from the master cylinder and effects a volumetric increase in the region near the wheel brake cylinder.

4. A pressure booster and modulator as defined by claim 3, characterized in that said second permanent magent (39) supported in said housing (30) is displaceable under the influence of the brake pressure coming from the master cylinder, with a simultaneous volumetric reduction in the pressure chamber (42) communicating with at least one wheel cylinder (42') and approach toward said first magnet (44) inside said housing, in which said first magnet is held stationary when ABS functions are not being performed.

5. A pressure booster and modulator as defined by claim 3, in which said housing has transverse conduits (33, 33'), which are penetrated by said rod (45), which rod has at the level of the transverse conduits an annular recess (58), such that in the initial position of the rod (45) and said associated first permanent magnet (44), the connecting line from the master cylinder (31) is opened for action upon said second permanent magnet (39), which is disposed in a leak-free and slidably displaceable manner along leak-free central stationary guide, inner housing pipe union (40).

6. A pressure booster and modulator as defined by claim 3, in which said first and second permanent magnets (44, 39) are disposed with their outer dimensions spaced apart from a housing bore and are pressed by prestressing springs (50, 54) against stops (53), and the bore bottom of a housing part (36) which are stationary with respect to the housing.

7. A pressure booster and modulator as defined by claim 1, in which said pressure chamber (6a) includes a wall that is embodied by the position of a plunger (5) associated with said potential energy storage means (3).

8. A pressure booster and modulator as defined by claim 7, in which said first movable permanent magnet is subject to a pressure of a master cylinder which pressure is present at the inlet (17), with a condition that an initial displacement effected thereby is boosted by a mutual magnetic force of attraction so as to increase the pressure of the brake fluid at the outlet.

9. A pressure booster and modulator as defined by claim 7, in which said first movable permanent magnet (3) includes a plunger (2) supported slidably in a narrowed cylindrical guide (20) of said housing (1), upon which plunger a fluid pressure arriving from the master cylinder acts, and said pressure chamber (6a) includes a second outlet connected with said main outlet, said relief means is a check valve (9) operative to close said second outlet and a relief pressure chamber (6b) connected with said main outlet and formed in said second movable pemanent magnet, the volume of which is determined by the position of said second movable permanent magnet, which is likewise displaceable in said housing.

10. A pressure booster and modulator as defined by claim 9, which includes at least one exciter coil for simultaneously realizing ABS functions—integrated ABS—characterized in that said second movable permanent magnet is displaceable for realizing ABS functions, exclusively by the current flowing through said exciter coil (11), such that at the onset of ABS functions said second movable permanent magnet is moved away from said first movable permanent magnet which closes said check valve (9) to said primary pressure chamber (6a) and simultaneously, by volumetric enlargement in said relief pressure chamber determined by movement of said second movable permanent magnet effects a pressure relief in the area near the wheel brake cylinder.

11. A pressure booster and modulator as defined by claim 10, in which the housing (1) forms two separate slide guides, one each for the first and second movable permanent magnets, said guides are disposed in compartments (15a, 15b) divided by a partition (16), and that the partition, by means of annular walls (19a, 19b) of smaller diameter as compared with compartments (15a, 15b), includes cylindrical slide guides (21a, 21b) for forming said pressure chamber (6a) as well as said relief pressure chamber (6b) in which chambers (6a and 6b) said plungers (5, 7) are slidably displaceably supported, in which said plungers are respectively part of said associated permanent magnets.

12. A pressure booster and modulator as defined by claim 11, in which the radial dimensions of the first and second movable permanent magnets (3, 4) extend beyond the plunger-cylinder units (21a, 21b; 5, 7) which determines a particular pressure boosting and pressure modulation that occurs, and that in addition to said exciter coil (11) for performing ABS functions which is oriented toward said second movable permanent magnet (4), a further electrical exciter coil (11') is oriented toward said first movable permanent magnet (3) for arbitrarily varying the position of said first movable permanent magnet (3) and for effecting a corresponding pressure increase in the associated primary pressure chamber (6a) regardless of the brake pedal position, such that ASR functions (anti-slip regulation) are attained.

13. A pressure booster and modulator as defined by claim 12, in which said valve assembly (9) divides the pressure chamber (6a) from said relief pressure chamber (6b), a pressure pin (8) associated with valve assembly 9 and driven by the plunger (7) of said second movable permanent magnet thereby effecting an opening of the valve 9, the pin (8) keeping the valve assembly (9) in the open state for as long as said second movable permanent magnet is located on a stop defined by said partition (16) and by a mutual force of attraction with the first movable permanent magnet.

14. A pressure booster and modulator as defined by claim 13, in which the pressure pin (8) on the plunger (7) of the second movable permanent magnet raises a valve ball (9a) of the valve assembly (9) from its seat, when the second movable permanent magnet is in a stop position.

15. A pressure booster and modulator as defined by claim 14, in which said partition (16) has openings, through which extensions (4') of said second movable permanent magnet extend toward said first movable permanent magnet (3) in order to increase a mutual force of attraction, whenever ABS pressure modulations are absent and said second movable permanent magnet (4) remains on its stop.

16. A pressure booster and modulator as defined by claim 15, in which said extensions (4') have a conical shape with a correspondingly tapering front portion.

17. A pressure booster and modulator as defined by claim 9, in which the housing (1) forms two separate slide guides, one each for the first and second movable permanent magnets, said guides are disposed in compartments (15a, 15b) divided by a partition (16), and that the partition, by means of annular walls (19a, 19b) of smaller diameter as compared with compartments (15a, 15b), includes cylindrical slide guides (21a, 21b) for forming said pressure chamber (6a) as well as said relief pressure chamber (6b) in which chambers (6a and 6b) said plungers (5, 7) are slidably displaceably supported, in which said plungers are respectively part of said associated permanent magnets.

18. A pressure booster and modulator as defined by claim 17, in which the radial dimensions of the first and second movable permanent magnets (3, 4) extend beyond the plunger-cylinder units (21a, 21b; 5, 7) which determines a particular pressure boosting and pressure modulation that occurs, and that in addition to said exciter coil (11) for performing ABS functions which is oriented toward said second movable permanent magnet (4), a further electrical exciter coil (11') is oriented toward said first movable permanent magnet (3) for arbitrarily varying the position of said first movable permanent magnet (3) and for effecting a corresponding pressure increase in the associated primary pressure chamber (6a) regardless of the brake pedal position, such that ASR functions (anti-slip regulation) are attained.

19. A pressure booster and modulator as defined by claim 18, in which said valve assembly (9) divides the pressure chamber (6a) from said relief pressure chamber (6b), a pressure pin (8) associated with valve assembly 9 and driven by the plunger (7) of said second movable permanent magnet thereby effecting an opening of the valve 9, the pin (8) keeping the valve assembly (9) in the open state for as long as said second movable permanent magnet is located on a stop defined by said partition (16) and by a mutual force of attraction with the first movable permanent magnet.

20. A pressure booster and modulator as defined by claim 19, in which the pressure pin (8) on the plunger (7) of the second movable permanent magnet raises a valve ball (9a) of the valve assembly (9) from its seat, when the second movable permanent magnet is in a stop position.

21. A pressure booster and modulator as defined by claim 9, which includes a pressure line (22) extending from said inlet through said first movable permanent magnet which leads from said pressure line to the primary pressure chamber (6a).

22. A pressure booster and modulator as defined by claim 7, which includes a pressure line (22) extending from said inlet through said first movable permanent magnet which leads from said pressure line to the primary pressure chamber (6a).

23. A pressure booster and modulator as defined by claim 1, in which said housing is cup-shaped and includes a bore, a first permanent magnet (66) is supported in a slidably displaceable manner, under the force of the master cylinder, via an associated piston secured to said first permanent magnet and acts as a plunger (70), said first permanent magnet is supported at a predetermined distance from a second permanent magnet (67), forming a pressure chamber (71) therebetween, said second permanent magnet in turn being supported in a slidably displaceable and leak-free manner in the housing bore such that said second permanent magnet is movable up to a predetermined stop in a direction toward said first permanent magnet (66) and rests on said stop under the influence of a pre-stressing spring (73), such that in the event of instability in the magnetic brake booster action caused by a change in the pressure/displacement characteristic curve of the wheel brake, said first permanent magnet (66) that is subject to the pressure action of the master brake cylinder moves closer to said second permanent magnet (67), counter to the force of a pre-stressing spring (77) disposed between the two magnets, to the point of adhesion to said second permanent magnet, and subsequent thereto both magnets (66, 67) undergo a further displacement in the modulator housing with merely a pressure transmitting function.

24. A pressure booster and modulator as defined by claim 23, in which both permanent magnets (67', 85) inside the modulator housing bore are held in an initial position solely by pre-stressing springs respectively disposed between them and acting counter to the housing.

25. A pressure booster and modulator as defined by claim 1, in which both permanent magnets (67', 85) inside the modulator housing bore are held in an initial position solely by pre-stressing springs respectively disposed between them and acting counter to the housing.

26. A pressure booster and modulator as defined by claim 25, in which said second permanent magnet (67') oriented toward the wheel brake cylinder includes a plunger (87) secured thereto, said plunger penetrates said first permanent magnet (85) oriented toward the master brake cylinder connection, and said plunger (87) is guided in a leak-free, slidably displaceable manner in an annular piston (89) each of which are exposed to the pressure of the master brake cylinder.

27. A pressure booster and modulator as defined by claim 26, in which said annular piston (89) is itself supported in a leak-free, slidably displaceable manner in a sliding guide that is narrowed toward a housing bore and itself is likewise exposed to the pressure of the master brake cylinder and on its remote side is connected to the said first permanent magnet (85) such that said permanent magnets (67' and 85) adjust in terms of their relative position as a function of the wheel brake cylinder pressure, such that the thereby resulting boosting factor undergoes an adaptation to a pressure/displacement characteristic curve of the wheel brake.

* * * * *